Sept. 15, 1970 H. HASS 3,528,444
FLUIDIC DIGITAL CONTROLLER
Filed Aug. 28, 1968 3 Sheets-Sheet 1
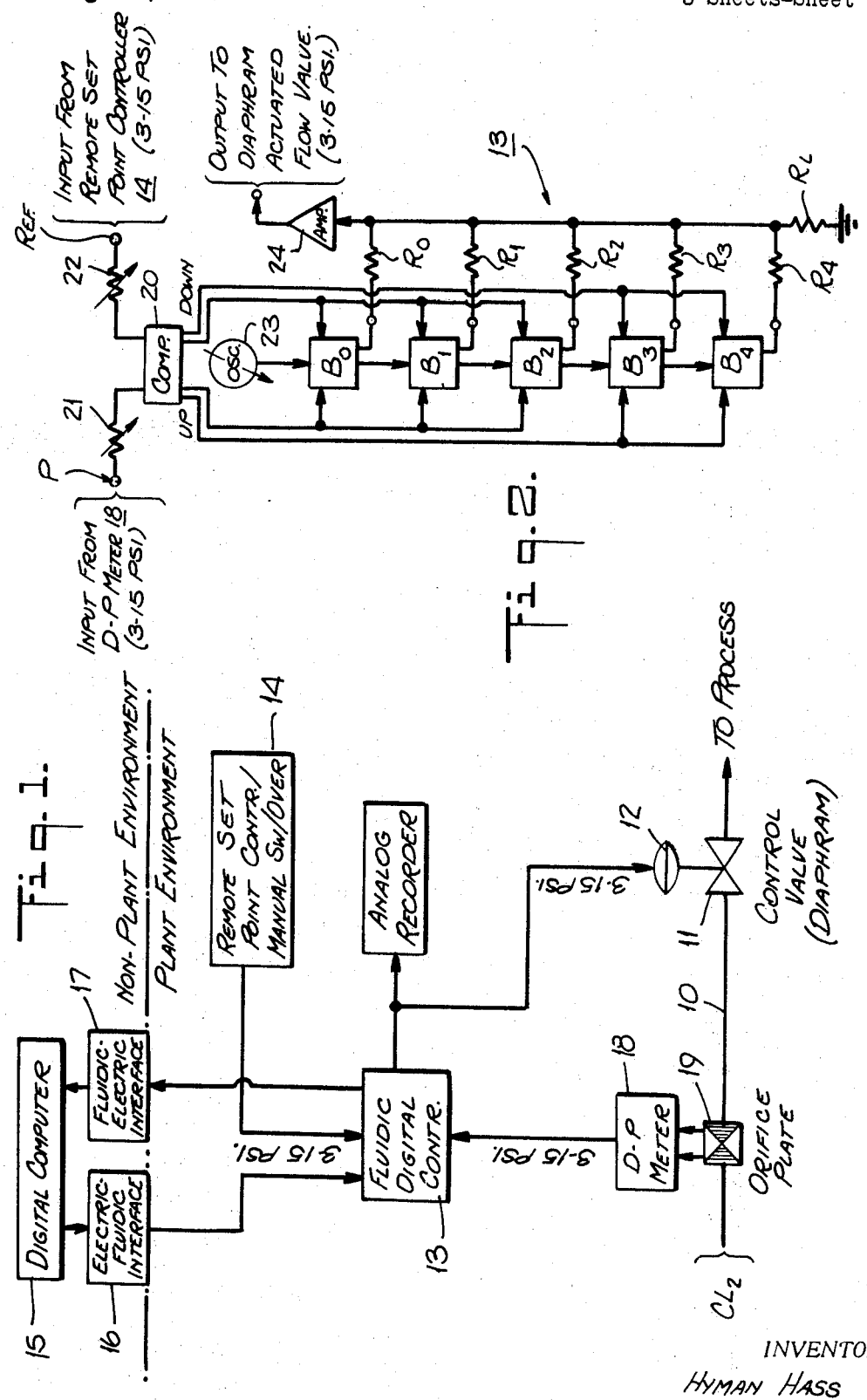
INVENTOR.
HYMAN HASS
BY
ATTORNEY

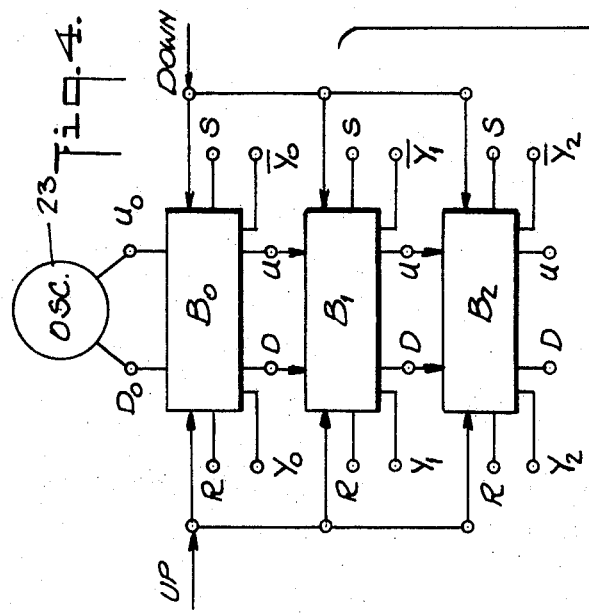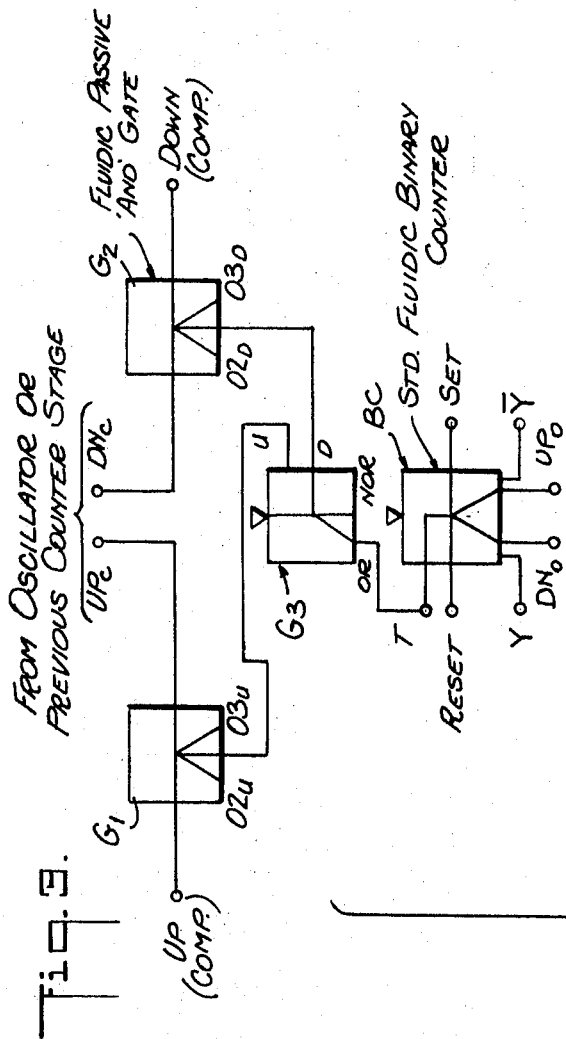

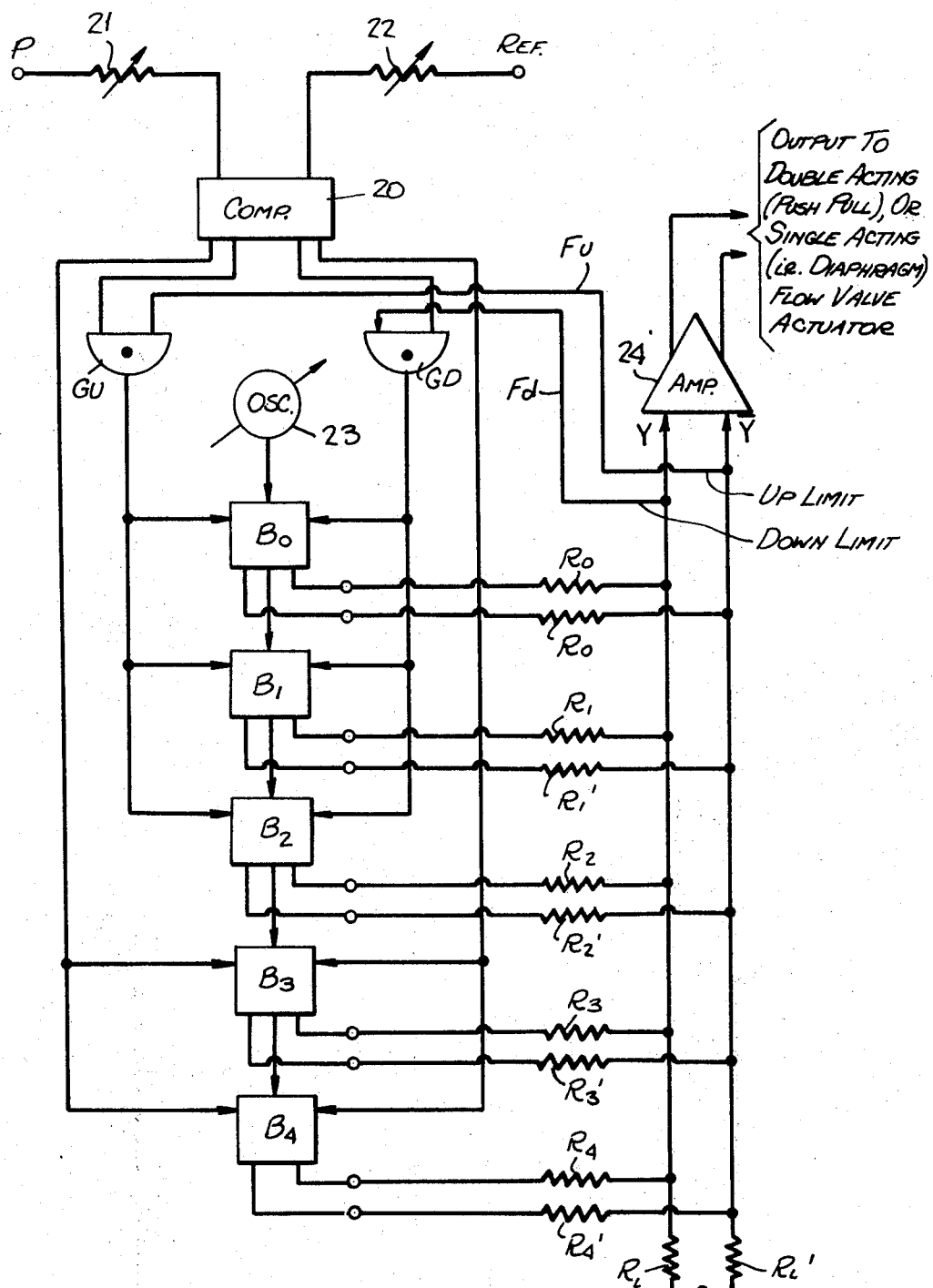

3,528,444
FLUIDIC DIGITAL CONTROLLER
Hyman Hass, Stamford, Conn., assignor to Applied Fluidics, Inc., Stamford, Conn., a corporation of Delaware
Filed Aug. 28, 1968, Ser. No. 756,058
Int. Cl. F15c 1/12
U.S. Cl. 137—81.5                                 9 Claims

ABSTRACT OF THE DISCLOSURE

A fluidic digital process controller for comparing a pneumatic input signal representing a set point value with a pneumatic input signal representing a process variable to produce a pneumatic output signal proportional to the error therebetween in order to govern a final control element in a direction and to an extent causing said process variable to return to the set point value. The controller is constituted by a comparator responsive to the pneumatic input signals to produce a directional UP or DOWN signal depending on the relative levels of the input signals. The directional signal is applied to the several stages of a chain of reversible binary counters which act to count periodic clock pulses generated by an oscillator, thereby producing a train of higher or lower order numbers, depending on whether the directional signal is UP or DOWN. The total count yielded by the binary chain is converted into an analog pneumatic signal proportional to the magnitude and sense of the error between the input signals, this signal serving to actuate the final control element to correct said error.

---

This invention relates generally to fluidic digital control devices, and more particularly to a fluidic digital process controller acting in conjunction with a final control element in a process control loop to maintain a process variable at a desired value.

In a typical process control system, a fluid, which may be a liquid or a gas, is conducted through a control valve or final control element into a load. An electronic or pneumatic controller is a component in a process control loop which is subject to disturbances, the controller acting in conjunction with other devices to maintain a process variable at a desired value. To accomplish this purpose, the controller receives both the desired value or set point and the process variable, the controller comparing the error therebetween and functioning to position a final control element which directly affects the process variable being controlled.

The variable controlled may be flow rate, temperature, pressure, humidity, liquid level, viscosity, or any other process variable. Thus, in the case of a pneumatic controller, the input motion may be obtained from a rate-of-flow meter or rotameter whose reading is translated into a mechanical motion which is applied to the input lever of the controller.

The pneumatic output of the controller may be impressed upon a flow-regulating valve operated by a pneumatic motor, which valve is opened or closed, or whose intermediate position is determined, by the pneumatic controller. It is also possible to operate final control elements in other forms, such as variable-speed belt feeders and the like.

Automatic controllers are generally classified by the types of control action or the modes of control they provide. The modes most commonly used in controllers are proportional position, proportional plus reset, proportional plus rate, and proportional plus reset plus rate.

In the proportional-position mode, the actuating signal applied to a pneumatic controller causes a change in output pressure proportional thereto. The degree of change in output pressure for a given change in actuating signals depends on the proportional band of the device. "Proportional band" is the range of the controlled variable which corresponds to the full operating range of the final control element. Reset action causes a change in output pressure proportional to the time integral of the actuating signal, whereas rate action causes the output pressure to vary as the rate of change of the actuating signal. Rate action is used in conjunction with proportional position and with proportional plus reset actions.

Electronic controllers carry out the same functions, but input and output values are electrical rather than pneumatic in character. While at present, pneumatic controllers are more widely used than electronic controllers, both have advantages and drawbacks, so that the choice of a controller in a given situation often depends on whether the advantages outweigh the drawbacks.

Pneumatic controllers have certain obvious advantages over electronic controllers, for there are no circuits to be shorted, and maintaince personnel are in no danger of electrocution. Moreover, pneumatic controllers are inherently explosion-proof and are more readily adapted to effect control in any one of the known operating modes. On the other hand, because they are composed of moving parts subject to wear and deterioration, pneumatic controllers have a limited life expectancy and suffer from hysteresis effects. Another drawback of pneumatic controllers is that they function as analog devices; hence when operating in conjunction with direct digital control (computer), it becomes necessary to include a relatively costly digital-to-analog converter to intercouple these units.

Since electronic controllers are solid-state devices without moving parts, they have a high order of reliability and a long life expectancy, provided the controller is protected from adverse factors in the environment of the installation. Because electronic controllers utilize digital circuits, they may be directly coordinated with digital computer control systems. Such control has the advantage of a predictive control of the process variable, this advantage being lacking in analog control.

Despite the functional advantages of electronic controllers, limited use is made thereof, for maintenance and trouble-shooting of such controllers call for skilled technicians and engineers whose services are costly and not always available. Electronic controllers are not explosion-proof, and a failure of the controller in a process control system may have very serious consequences. Moreover, they are adversely affected by all liquids, corrosive and polluted environments, heat, electromagnetic interference, power supply surges, radiation, and other conditions which may be encountered in an industrial plant.

Accordingly, it is the main object of this invention to provide a fluidic digital controller in which the operating medium is a liquid or a gas, which fluidic controller possesses the advantages heretofore found in pneumatic and electronic controllers, but without the drawbacks incident thereto.

It is known that digital fluidics perform the same logic functions as electronic and other digital methods, and that digital theory is applicable to fluidic circuits. While fluidics cannot match electronics for speed, its speed is comparable to conventional hydraulics and pneumatics as well as to electromechanical relays; hence within the context of process control systems, the speed limitations of fluidics are not a material drawback. A fluidic controller in accordance with the invention is inherently explosion-proof, the controller having no moving parts and being free of hysteresis and wear.

More specifically, it is an object of this invention to provide a fluidic digital controller which is adapted to compare an input pneumatic signal representing set point with an input pneumatic signal representing the process variable to produce, through digital means, a pneumatic output signal proportional to the error between the input signals.

Among the significant features of a fluidic digital controller in accordance with the invention are a degree of reliability and life expectancy exceeding both electronic and pneumatic devices, and the fact that the fluidic controller, which is unaffected by environmental factors, is virtually maintenance free and completely safe. An important advantage incident to fluidics is the elimination of down time due to failure. For industrial and chemical processing, the cost of such down time far exceeds the cost of the components in the process control system.

Briefly stated, these objects are accomplished by a fluidic digital process controller which includes a comparator for comparing a pneumatic input signal in analog form representing a set point value, with a pneumatic input signal in analog form representing a process variable, the comparator producing a directional signal which depends on the relative levels of the two input signals. The directional signal is applied to the several stages of a chain of reversible binary counters which is supplied with periodic clock pulses, the chain only counting when a directional signal and a clock pulse are both present to produce a train of higher or lower order numbers, depending on whether the directional signals is UP (set point higher than process variable) or DOWN (set point lower than process variable). The total count yielded by the binary chain is converted into an analog pneumatic output signal proportional to the magnitude and sense of the error between the pneumatic input signals, the output signal serving to actuate the final control element in a process loop to correct the error and thereby to maintain the process variable at a desired value.

For a better understanding of the invention, as well as other objects and further features thereof, reference is made to the following detailed description to be read in conjunction wtih the accompanying drawing, wherein:

FIG. 1 is a block diagram of a process control loop including a fluidic digital controller in accordance with the invention;

FIG. 2 is a schematic diagram of the fluidic digital controller;

FIG. 3 schematically shows one of the reversible binary counters included in the controller and the truth table therefor;

FIG. 4 shows a three-stage reversible binary counter arrangement and the truth table therefor; and FIG. 5 is a fluidic controller with push-pull output.

THE PROCESS CONTROL LOOP

Referring now to FIG. 1, there is shown a basic process control system in accordance with the invention, for regulating the flow of a fluid (liquid or gas) or flowable solids in particulate form. By way of example, we shall assume that flowing through line 10 is a gas which is fed to a process through a final control element 11, which may be opened and closed to start and stop the flow, the element being adjustable to intermediate values between the open and closed states to vary the flow. For this purpose, final control element 11 may take the form of an air-operated proportional flow control valve operated by a diaphragm or cylinder actuator 12.

In a typical valve actuator, the input air-pressure signal is usually in the range of 3–15 p.s.i., the flow through the valve being rendered proportional to the pressure signal. If, therefore, a pressure of 3 p.s.i. corresponds to a closed valve state, a pressure of 15 p.s.i. is the fully-open state, and a pressure of 9 p.s.i., is fifty percent open, etc. Thus, by varying the intensity of pressure signal to actuator 12, one may vary the flow through valve 11 accordingly.

Process controller 13, which is a fluidic device in accordance with the invention, serves to maintain the flow through line 10 at the desired level. To accomplish this purpose, controller 13 compares the desired value or set-point signal and a signal corresponding to the process variable, to provide a control signal for operating the final control element 11. The set-point signal (3–15 p.s.i.) may be obtained from a manually-operated remote set-point source 14, or adigital computer 15, in which even an electric-fluidic interface 16 and a fluidic-electric interface 17 are provided to couple the controller thereto. The nature of computer control will be discussed later in detail.

The process feedback signal (3 to 15 p.s.i.), corresponding to the actual flow through process line 10 is obtained from a differential-pressure meter 18 or equivalent means coupled to an orifice plate 19 in the line. Controller 13, which compares the set point to the process variable, produces a control signal that is proportional to the difference or error therebetween.

If the set-point signal is higher than the feedback signal, process controller 13 will send a control signal to the final control element 11, causing it to open to an extent increasing the flow rate to restore the flow rate to its desired level. Conversely, if the set-point signal is lower than the feedback signal, the controller will direct the final control element to decrease the flow rate to an extent restoring the flow rate to its desired value.

The control loop, as described above, is essentially the same as that used in a pneumatic control system, except that in the present invention the controller is a fluidic digital device and not an analog pneumatic device. Digital theory is well-established and is fully applicable to fluidic circuits. The three principal fluidic devices are the jet interaction amplifier, the flow mode turbulence amplifier, and the focused jet amplifier.

As indicated in the article, "Digital Fluids Works Now," by Henke, in Control Engineering for January 1967, and in the references cited therein, fluidic devices are adapted to carry out logic functions, such as "OR," "AND" and "NOR." Fluidic logic gates can be built into the familiar digital circuits normally associated with electronics, such as Schmitt-trigger circuits, binary counters, and shift registers.

THE FLUIDIC PROCESS CONTROLLER

Referring now to FIG. 2, the essential components of the fluidic controller 13 are shown in block form. In the controller, the 3 to 15 p.s.i. signal from the differential pressure meter 18, which represents the process variable, provides one analog input to a comparator 20, the other analog input being the 3 to 15 p.s.i. signal from the set-point source. These input signals are introduced into the comparator through adjustable resistors 21 and 22, respectively. It is to be understood that while equivalent electrical terms are used in dealing with the fluidic circuit elements, in practice the resistances are devices such as valves, which act to lower the fluidic input signals to levels compatible with the comparator components.

Comparator 20 is made up of one or more Schmitt-trigger circuits, one for every three stages of binary counters. Comparator 20 compares the two input signals, which are analog in form (3 to 15 p.s.i.), and produces an UP output if the input signal Ref representing set-point, is greater than the input signal representing the process variable P; and a DOWN output if P is greater than Ref. If, on the other hand, Ref equals P, then the output from the comparator is zero. If the Ref signal varied sinusoidally or in an arbitrary manner between 3–15 p.s.i., comparator 20 would always produce an UP signal, if the P signal lagged the Ref signal, and a DOWN signal, if the Ref signal lagged the P signal.

Associated with comparator 20 is a five-stage chain of reversible binary counters $B_0$, $B_1$, $B_2$, $B_3$ and $B_4$. Fed into the first binary counter in the series chain are clock pulses produced by an oscillator 23, and applied to each of the binary counters in the chain are the UP and DOWN signals produced by the comparator 20. Oscillator 23 is a variable-frequency generator producing air pulses at a desired periodic rate. Thus, the oscillator may take the form of a fluidic flip-flop circuit having R-C feedback loops.

The arrangement is such that the counter chain functions to count clock pulses only when both a clock pulse and a directional signal (UP or DOWN) are present. When an UP signal and clock pulses are concurrently present, the reversible binary counter chain counts to higher order numbers. But when both a DOWN signal and clock pulses appear, the chain counts to lower order numbers. The output or ON state of each binary counter is represented by a flow of fluid (air) at a predetermined pressure $\Delta P_0$ above the OFF state pressure, which is usually that of ambient air.

Each stage in the binary chain has a binary value depending on its position in the chain. Counter $B_0=2^0=1$. Counter $B_1=2^1=2$; Counter $B_2=2^2=4$;

$$\text{Counter } B_3=2^3=8$$

and Counter $B_4=2^4=16$. The maximum count is equal to $2^n-1$ where $n$ is the number of stages. While the arrangement of FIG. 2 shows five stages, it will be appreciated that, in practice, a smaller or greater number may be used, depending on system requirements. With a five-stage chain, where $n=5$, the maximum count equals $2^5-1=31$. The maximum number of discrete counts equals $2^5=32=31+0$. Adding an additional counter stage doubles the maximum possible count.

Ref and P values, which digital train is converted into an analog signal proportional to the total binary count. This analog signal serves to actuate the final control element in the process control system in a direction and to an extent returning the process variable to the set-point level.

While the controller has been illustrated as made up of individual components, it is to be understood that in practice it may be constructed as a miniature integrated circuit not much larger than existing microelectronic circuits.

In effecting direct digital control (DDC) by means of an electronic computer 15, as shown in FIG. 1, the computer replaces the comparator and oscillator in controller 13, and DDC is obtained, with the following advantages. First, the output of computer 15 is fed directly to the fluidic digital controller without expensive signal conversion and conditioning. Second, the output of electronic computers is easily converted to a fluidic digital signal with existing electric-to-fluidic interface devices (device 16 in FIG. 1), such as the Electro-Fluidic Transducer Model 6040 manufactured by Pitney-Bowes. These interfaces may be located at the plant interface so that only fluidic components and no electrical components are placed in the plant environment. Fluidic signals can also be converted to electric signals (device 17 in FIG. 1) with existing compatible interface devices, such as the Pressure-Electric Switch Model PSF100A manufactured by Fairchild Controls, a division of Fairchild Camera and Isntrument Corp.

COUNTER TRUTH TABLE

| Number | 1 | 2 | 3 | 4 | 5 | 6 | 7 | 8 | 9 | 10 | 11 | 12 | 13 | 14 | 15 | 16→→ | 30 | 31 | 0→Pulses |
|---|---|---|---|---|---|---|---|---|---|---|---|---|---|---|---|---|---|---|---|
| $B_0$ | X |   | X |   | X |   | X |   | X |   | X |   | X |   | X |   | X |   | 0 |
| $B_1$ |   | X | X |   |   | X | X |   |   | X | X |   |   | X | X |   | X | X | 0 |
| $B_2$ |   |   |   | X | X | X | X |   |   |   |   | X | X | X | X |   | X | X | 0 |
| $B_3$ |   |   |   |   |   |   |   | X | X | X | X | X | X | X | X |   | X | X | 0 |
| $B_4$ |   |   |   |   |   |   |   |   |   |   |   |   |   |   |   | X→→ | X | X | 0 |

At the output of reversible binary counters $B_0$, $B_1$, $B_2$, $B_3$ and $B_4$, are fixed resistors $R_0$, $R_1$, $R_2$, $R_3$ and $R_4$, respectively. The value of each of these resistors is inversely proportional to the binary value of its associated counter. Thus the value of resistor $R_0=R/1$; that of resistor $R_1=R/2$; that of resistor $R_2=R/4$; that of resistor $R_3=R/8$; and that of resistor $R_4=R/16$. As a consequence, the magnitude or pressure level of the output flow from each reversible binary stage is proportional to the binary value thereof.

Accordingly, at Count 1, there is one unit of flow from stage $B_0$, while at Count 2 there are two units of flow from stage $B_1$. At Count 23, in which stages $B_0$, $B_1$ and $B_4$ are on, twenty-three units of flow are produced ($1+2+4+16$), which total is established at output resistor $R_L$, across which the outputs of resistors $R_0$ to $R_4$ are accumulated.

The controller output established across resistor $R_L$ is applied to the input of an operational amplifier 24 or a diaphragm-type proportional amplifier to produce an output pressure $\Delta P_0$, which is proportional to the input flow and hence to the total binary count. In effect, therefore, this output pressure represents a digital-to-analog conversion, the analog value serving to actuate the final control element (11 in FIG. 1) in a direction and to a degree tending to reduce the error to zero, at which point the system is in equilibrium.

The operation of the controller may therefore be summarized as follows:

Fed into the controller are pneumatic analog values representing the set point Ref and the process variable P, which values are compared to produce a directional signal (UP or DOWN) depending on the relative levels of the input values. The reversible binary counter chain which counts clock pulses in response to the directional signals, produces a train of fluidic digital pulses depending on the magnitude and sense of the error between the Direct digital control provides advanced predictive control unattainable with analog control. A fluidic digital controller is compatible with sequential logic control which would be used for DDC of an entire process or plant. The fluidic comparator could also be used for analog-to-digital conversion for feedback to the computer.

Thus a fluidic digital controller affords diversified capabilities in any process control system, making possible manual, automatic or computer control, as well as backup in the event of computer failure. A fluidic digital controller in accordance with the invention is capable of replacing any existing pneumatic or electronic controller without any material change in the system or hardware.

THE REVERSIBLE BINARY COUNTER

Referring now to FIG. 3, there is shown a reversible binary counter in accordance with the invention, this counter being one in the chain thereof in the controller arrangement. The reversible counter is constituted by a pair of fluidic passive "AND" gates $G_1$ and $G_2$, whose outputs are applied to an "OR/NOR" gate $G_3$, whose output, in turn, is applied to a fluidic binary counter BC of any standard design. In practice, active "AND" gates may be used in place of the passive "AND" gates $G_1$ and $G_2$, should higher output signals be desired.

In "AND" gate $G_1$, the input is an UP signal from the comparator (FIG. 2), and a pulse $UP_c$ from the oscillator (in the event the reversible counter is the first in the chain) or a pulse from the previous counter (in the event the reversible counter is a subsequent stage in the chain). In "AND" gate $G_2$, the input is a DOWN signal from the comparator, and a pulse $DN_c$ from the oscillator of the previous counter stage. An UP signal and a pulse is required for the gate $G_1$ to change state and a DOWN signal and a pulse is required for gate $G_1$ to change state.

The "OR/NOR" gate, which is coupled to the "AND" gates $G_1$ and $G_2$, produces an output which is fed to standard binary counter BC only if either one or the other of the "AND" gates yields a pulse, but not if neither is functioning. The binary counter provides an output fluid pressure Y in the event a directional UP signal and an input pulse are present, and a fluidic pressure $\overline{Y}$ in the event a directional DOWN signal and an input pulse are present. If Y is considered to be the true state, then $\overline{Y}$ may be considered the complementary state.

THREE-STAGE REVERSIBLE COUNTER CIRCUIT

In FIG. 4, there is shown a three-stage chain of reversible binary counters $B_0$, $B_1$ and $B_2$, of the type illustrated in FIG. 3. It will be seen that the UP and DOWN directional signals from the comparator in the controller are applied to all three stages. The clock pulses from oscillator 23 are fed into the $D_0$ and $U_4$ pulse inputs of the first stage $B_0$, each stage yielding a Y or $\overline{Y}$ output, depending on the directional signal.

In the truth table shown in FIG. 4, the "ON" state of Y outputs is denoted by numeral 1, and the "OFF" state, by numeral 0. The binary sum of Y outputs is equal to the count. The counter will count UP when the previous Y output is 0, and DOWN when the previous Y output is 1. For example, assuming the count of 6, then the binary is (110). On the next down-pulse, $Y_0$ goes to $(1+DN)$. Consequently, $Y_1$ changes the state and goes to $(0+UP)$. $Y_2$ does not change state, because Y did not go to $(1+DN)$. Thus the new count is $5=(101)$.

CONTROLLER WITH PUSH-PULL OUTPUT

It is often necessary to provide a controller for differential operations, as for example, in an arrangement in which the final control element is of the double-acting or push-pull type.

The arrangement shown in FIG. 5 is similar to that in FIG. 2, in that here too we have a five-stage chain of reversible binary counters $B_0$ to $B_4$, clock pulses being fed into the first stage $B_0$ by an oscillator 23. Applied to each stage in the chain are UP and DOWN signals produced by comparator 20. However, in order to effect push-pull operation, at the output of the stages we have the resistors $R_0$ to $R_4$, as in FIG. 2, and also a second set of resistor $R_0'$ to $R_4'$. The total of resistors $R_0$ to $R_4$ is established across output resistor $R_L$, while the total of resistors $R_0'$ to $R_4'$ is established across output resistor $R_L'$. The output Y across resistor $R_L$ goes to the Y input of differential amplifier 24', while the output $\overline{Y}$ across resistor $R_L'$ goes to the $\overline{Y}$ input thereof.

For differential operation, the Y and $\overline{Y}$ outputs have identical resistors, the sum of the outputs being always equal to the total pressure range (12 p.s.i. for a 3–15 p.s.i. range). For a single-ended output, as with a single-acting (i.e., diaphragm) flow valve actuator, one merely blocks the $\overline{Y}$ input to the amplifier.

In order to stop the UP and DOWN count applied to the binary stages when predetermined maximum or minimum values are reached, the UP and DOWN signals are applied through gates GU and GD, respectively, which are operated by feedback lines $F_U$ and $F_D$ coupled to the Y and $\overline{Y}$ inputs of the amplifier, so as to close the gates when the predetermined value is attained.

While there has been shown and described a preferred embodiment of fluidic digital process controller in accordance with the invention, it will be appreciated that many changes and modifications may be made therein without, however, departing from the essential spirit of the invention as defined in the annexed claims.

It is to be understood the controller disclosed herein in connection with process control is also usable in many other situations in which two input analog values are to be compared to produce an output analog value which is a function of the difference therebetween. For example, in controlling the thickness of sheet steel or other material in a rolling or extrusion process, the actual thickness of the material may be compared with a reference value to produce a control signal for governing the thickness-control means.

What I claim is:

1. A fluidic digital controller responsive to first and second input signals in analog form to produce an output signal which depends on the magnitude and sense of the difference between the input signals, said controller comprising:
    (a) means comparing said analog input signals to produce a pneumatic directional signal which is UP when the first input is greater than the second input and which is DOWN when the reverse is true,
    (b) a chain of reversible fluidic binary counter stages each of which is coupled to said directional signal means and is operative to count only when a pneumatic pulse is simultaneously present,
    (c) means to apply to the first stage in the chain, pneumatic clock pulses at a predetermined constant periodic rate to cause the stages in the chain to produce a train of higher or lower order numbers depending on whether the directional signal is UP or DOWN, and
    (d) means to totalize the numbers produced by the stages in the chain to provide a pneumatic output signal which is an analog of the difference in the input signals.

2. A controller as set forth in claim 1, wherein said input signals are representative of a set point and a process variable in a process control loop.

3. A controller as set forth in claim 2, wherein said control loop includes a final control element and said output signal is applied thereto to maintain said process variable at the level of said set point.

4. A controller as set forth in claim 3, wherein said set point is derived from an electronic computer having a digital output which is converted into an analog value providing one of said input signals.

5. A controller as set forth in claim 4, wherein said final control element is a valve which is actuated by a pressure-responsive diaphragm.

6. A controller as set forth in claim 1, wherein each stage in said chain has a successively higher binary value, and further including a resistance in the output of each stage whose value is inversely proportional to the value of the associated stage to produce a fluid pressure in said output which is proportional to the binary value.

7. A controller as set forth in claim 6, further including a load resistor coupled to said resistance to totalize the binary value produced thereacross.

8. A controller as set forth in claim 1, wherein said clock pulses are produced by a flip-flop fluidic device.

9. A controller as set forth in claim 1, wherein each reversible binary counter stage is formed by a pair of AND gates, a respective directional signal and a clock pulse being applied to each gate, the output of the AND gates being applied to an OR/NOR gate which produces an output only if one or the other of the AND gates is operative, the output of the OR/NOR gate being applied to a fluidic binary counter.

References Cited

UNITED STATES PATENTS

| | | | |
|---|---|---|---|
| 3,224,674 | 12/1965 | Warren | 235—201 |
| 3,228,602 | 1/1966 | Boothe | 137—81.5 X |
| 3,292,648 | 12/1966 | Colston | 137—81.5 X |
| 3,395,719 | 8/1968 | Boothe et al. | 235—201 |

ARNOLD ROSENTHAL, Primary Examiner

W. R. CLINE, Assistant Examiner

U.S. Cl. X.R.

235—201